(12) United States Patent
Piwonka et al.

(10) Patent No.: US 8,296,579 B2
(45) Date of Patent: Oct. 23, 2012

(54) SYSTEM AND METHOD FOR UPDATING A BASIC INPUT/OUTPUT SYSTEM (BIOS)

(75) Inventors: Mark A. Piwonka, Tomball, TX (US); José A. Sancho-Dominguez, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 378 days.

(21) Appl. No.: 12/613,677

(22) Filed: Nov. 6, 2009

(65) Prior Publication Data

US 2011/0113181 A1  May 12, 2011

(51) Int. Cl.
*G06F 11/30* (2006.01)
*G06F 12/14* (2006.01)

(52) U.S. Cl. ........ 713/189; 380/278; 380/279; 380/280; 380/281; 380/282

(58) Field of Classification Search .............. 713/189; 380/277–282
See application file for complete search history.

(56) References Cited

U.S. PATENT DOCUMENTS

| | | | |
|---|---|---|---|
| 5,978,913 A | 11/1999 | Broyles | |
| 6,073,206 A | 6/2000 | Piwonka | |
| 6,148,387 A | 11/2000 | Galasso | |
| 6,405,311 B1 | 6/2002 | Broyles | |
| 6,467,038 B1 | 10/2002 | Piwonka | |
| 6,505,278 B1 | 1/2003 | Piwonka | |
| 6,567,868 B1 | 5/2003 | Tran | |
| 6,647,512 B1 | 11/2003 | James | |
| 6,754,793 B2 | 6/2004 | Piwonka | |
| 6,769,059 B1 | 7/2004 | Qureshi et al. | |
| 6,832,320 B1 | 12/2004 | Broyles | |
| 6,892,304 B1 | 5/2005 | Galasso | |
| 7,069,472 B2 | 6/2006 | James | |
| 7,174,465 B2 | 2/2007 | Freeman | |
| 7,313,685 B2 | 12/2007 | Broyles | |
| 7,395,434 B2 | 7/2008 | Piwonka | |
| 7,552,475 B2 | 6/2009 | Piwonka | |
| 7,599,889 B2 | 10/2009 | Broyles | |
| 2001/0007131 A1 | 7/2001 | Galasso | |
| 2003/0088728 A1 | 5/2003 | Piwonka | |
| 2003/0208696 A1 | 11/2003 | Piwonka | |
| 2004/0073842 A1 | 4/2004 | James | |
| 2004/0215954 A1 | 10/2004 | Piwonka | |
| 2005/0010810 A1 | 1/2005 | Broyles | |
| 2005/0172111 A1 | 8/2005 | Marcak | |
| 2005/0229249 A1 | 10/2005 | Piwonka | |
| 2005/0246517 A1 | 11/2005 | Volentine | |

(Continued)

OTHER PUBLICATIONS

U.S. Department of Commerce/National Institute of Standards and Technology, "Digital Signature Standard (DSS)," Federal Information Processing Standards Publication 186, May 19, 1994, Gaithersburg, Maryland.

*Primary Examiner* — Jeffrey Pwu
*Assistant Examiner* — Jayesh Jhaveri

(57) ABSTRACT

There is provided a system and method for updating a basic input output system (BIOS). An exemplary method comprises obtaining a BIOS update package comprising a BIOS image update, a BIOS Signature, and a plurality of Public Key regions, wherein each Public Key region comprises a Public Key area and a signature area. The exemplary method also comprises updating a current Public Key with a new Public Key if the new Public Key is identified in one of the Public Key regions. The exemplary method additionally comprises validating the BIOS Signature using the current Public Key.

20 Claims, 6 Drawing Sheets

U.S. PATENT DOCUMENTS

| | | |
|---|---|---|
| 2006/0020810 A1 | 1/2006 | Waltermann |
| 2006/0020844 A1 | 1/2006 | Gibbons |
| 2006/0020845 A1 | 1/2006 | Broyles |
| 2006/0136703 A1* | 6/2006 | Wisecup et al. .................. 713/2 |
| 2006/0136708 A1 | 6/2006 | Hajji |
| 2006/0143600 A1* | 6/2006 | Cottrell et al. ................ 717/168 |
| 2006/0224878 A1 | 10/2006 | Datta |
| 2007/0016800 A1 | 1/2007 | Spottswood |
| 2007/0074037 A1* | 3/2007 | Eckleder ....................... 713/180 |
| 2007/0101117 A1 | 5/2007 | Piwonka |
| 2007/0130377 A1 | 6/2007 | Piwonka |
| 2007/0169076 A1 | 7/2007 | Desselle |
| 2007/0283003 A1 | 12/2007 | Broyles |
| 2008/0082824 A1* | 4/2008 | Ibrahim et al. ................ 713/171 |
| 2008/0120499 A1* | 5/2008 | Zimmer et al. ................... 713/2 |
| 2008/0126711 A1 | 5/2008 | Hobson |
| 2008/0162848 A1 | 7/2008 | Broyles |
| 2008/0184026 A1* | 7/2008 | Hall et al. ..................... 713/100 |
| 2009/0063844 A1 | 3/2009 | Hou |
| 2009/0172639 A1* | 7/2009 | Natu et al. .................... 717/120 |
| 2010/0048296 A1* | 2/2010 | Adiraju .......................... 463/29 |
| 2010/0077199 A1* | 3/2010 | Hobson et al. ............... 713/100 |
| 2010/0287363 A1* | 11/2010 | Thorsen ............................ 713/2 |

* cited by examiner

SYSTEM AND METHOD FOR UPDATING A BASIC INPUT/OUTPUT SYSTEM (BIOS)

BACKGROUND

The basic input and output system (BIOS) typically controls the start-up process of a computer system. In so doing, the BIOS may perform a number of functions, including identifying, testing, and initializing system devices, such as man-machine interfaces, network interfaces, disk drives, and the like. After initialization, the BIOS may start an operating system and may pass part or all of the functions to the operating system.

The BIOS is typically stored on a read-only memory (ROM) chip. The chip may be rewritable to allow upgrading of the BIOS over the life of the computer system. For example, the chip may be an EEPROM (electrically erasable ROM) or flash memory whose contents may be updated in a process called flashing. This may be performed using a BIOS update package, which is a software product that may, for example, be provided on a flash drive, a disk, or from a remote storage system over a network connection.

Because the BIOS is often the first code that operates during startup of the computer system, it provides a potential point of attack for persons wishing to compromise the security of the computer system. Moreover, the process of updating the BIOS is often used by hackers as a way to compromise the security of a computer system. By replacing the true system BIOS with a compromised version, system security features may be disabled or not initiated in the first place.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1A:
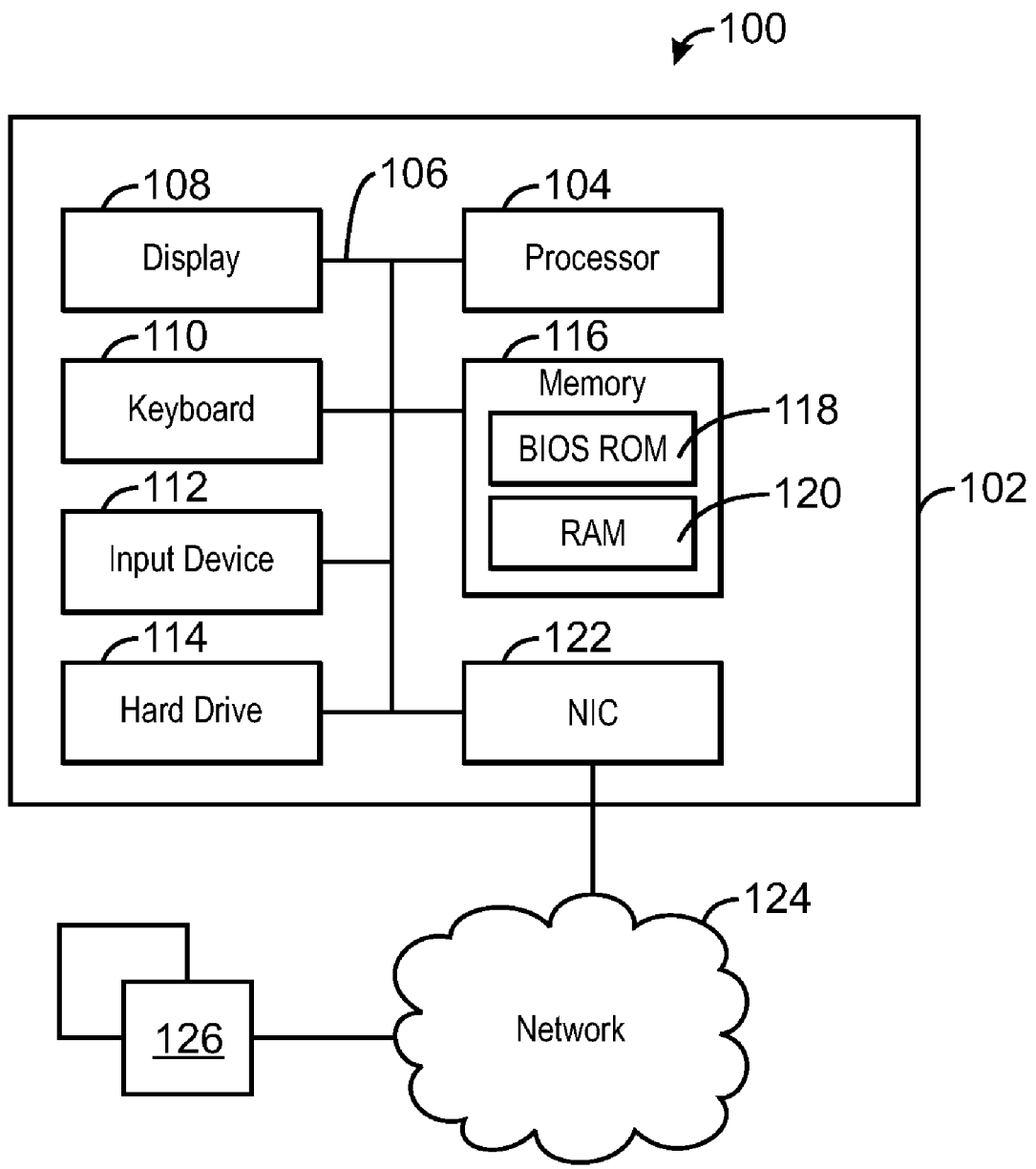
FIG. 1A is a block diagram of a system that may be used to update a BIOS in accordance with an exemplary embodiment of the present invention.

Exemplary embodiments of the present invention relate to a system and method for securely replacing a BIOS of a computer system. Moreover, exemplary embodiments of the present invention relate to verifying that a BIOS update originated from the manufacturer of the computer system or from another trusted source.

BIOS update packages may include Signatures that may be used to verify the source of the update. For example, the Signatures may be generated using a procedure consistent with the Digital Signature Standard discussed in the Federal Information Processing Standard (FIPS) 186, Digital Signature Standard (DSS), issued by the National Institute of Standards in May, 1994. In accordance with the DSS, the Signature may be an encrypted hash code generated from a BIOS image update in a BIOS update package. The BIOS image update is the actual code that will be used to replace a current BIOS image in the BIOS ROM. More specifically, the BIOS image update may be processed using a standard hashing algorithm (SHA), such as a SHA-1 or SHA-2 to generate the hash code.

The SHAs provide a one way function that generates a hash code that is specific to the sequence that has been processed. Any change to the underlying text should produce a change in the resulting hash code. The hash code may then be encrypted using a Private Key kept in a secure location by the signer and included in a BIOS update package. A Public Key matched to the Private Key may then be provided by the signer and used by the system management mode (SMM) code for validating update packages.

The validation of a BIOS update package by the SMM code begins with the generation of a BIOS hash code from the BIOS image update in the BIOS update package. This is performed using the same algorithm used to generate the original hash code contained in the Signature. The Signature is then decrypted using the Public Key stored in the current BIOS to provide the original hash code. The original hash code is compared to the BIOS hash code and, if the codes match, the BIOS image update is considered to be authentic and uncorrupted. The BIOS image update may then be used to flash the BIOS update into the BIOS ROM. However, if the two hash codes do not match, the system may refuse the update and inform the user.

This technique helps to ensure that the update is authentic and uncorrupted. However, Public Keys may expire or be revoked over the lifetime of a product; for example, if a corresponding Private Key has been compromised. Further, the SMM code may not have the ability to connect to a signing authority to verify that the BIOS image is properly signed. Thus, SMM code may be configured to store the Public Key in a secure area within the BIOS ROM and may be able to update to a new Public Key when the old Public Key expires or is revoked. For example, the Public Key may be stored in the SMM code itself. Whenever a new Public Key is required, a BIOS update package may be released containing the new Public Key signed using the old Private Key.

However, when multiple Public Keys have been retired or revoked, the number of BIOS update packages released may become difficult to manage. For example, a user may have to perform several BIOS updates to get to the newest BIOS and Public Key, where each intermediate BIOS update is used to update to a newer Public Key, so that the next signed BIOS image can be flashed. Alternatively, every BIOS update package may contain multiple releases that are each signed with one of the old Public Keys. However, the user may then have to determine the correct image to use to update the BIOS by trial and error.

Another method for updating the Public Key may utilize a flash utility running under the operating system (O/S) to verify the authenticity of the BIOS image and then pass the authenticated BIOS image to the SMM code. A security hole exists when transferring the BIOS image from the O/S flash utility to the SMM code. For example, the image may be corrupted or compromised during the transfer. Thus, if the SMM code performs the validation of the BIOS update the image is not corrupted or compromised during the transfer.

Exemplary embodiments provide techniques for updating a Public Key in the BIOS ROM to the most recent Public Key without user intervention to identify the correct key or image to be used. For example, a BIOS update package may be generated that includes a BIOS update region and a number of Public Key regions, each having a Public Key area and a Signature area. During the BIOS update process each of the Public Key regions may be analyzed to determine whether a new Public Key has been provided in that region, as discussed in detail below. If a new Public Key has been provided, the new Public Key in that region replaces the old Public Key in the BIOS ROM. If multiple Public Keys have been released since the last BIOS update, each new Public Key will be identified, written into the BIOS ROM and then used to check the next Public Key region. After all of the Public Key regions have been processed, the last Public Key update which is stored in the BIOS ROM as the current Public Key, may then be used to validate the Signature of the BIOS update region.

FIG. 1A is a block diagram of a system that may be used to update a BIOS in accordance with an exemplary embodiment of the present invention. The system is generally referred to by the reference number 100. The functional blocks and devices shown in FIG. 1A may include hardware elements including circuitry, software elements including computer code stored on a tangible, machine-readable medium, or a combination of both hardware and software elements. Additionally, the functional blocks and devices of the system 100 are but one example of functional blocks and devices that may be implemented in an exemplary embodiment of the present invention. The system 100 can include any number of computing devices, such as cell phones, personal digital assistants (PDAs), computers, servers, laptop computers, or other computing devices.

In an exemplary embodiment, the system 100 can include a computer 102 having a processor 104 connected through a bus 106 to a display 108, a keyboard 110, and an input device 112 (such as a mouse or touch screen). The computer 102 may also include tangible, computer-readable media for the storage of operating software and data, such as a hard drive 114 or memory 116. The hard drive 114 may also include an array of hard drives, an optical drive, an array of optical drives, a flash drive, and the like. The memory 116 may be used for the storage of programs, data, and operating software, and may include, for example, the BIOS ROM 118 and random access memory (RAM) 120.

Exemplary embodiments of the present invention are not limited to a BIOS stored on a ROM chip, as other configurations can be used in the present techniques. For example, a code sequence in a ROM can be used to load a BIOS image to the RAM 120 from the hard drive 114. The computer can then be booted from the BIOS image in the RAM 120. In this embodiment, the BIOS image update may be applied to the stored BIOS image on the hard drive. Any number of other configurations that can be used will be recognized by those of ordinary skill in the art in light of the disclosure contained herein.

The computer 102 can be connected through the bus 106 to a network interface card (NIC) 122. The NIC 122 can connect the computer 102 to a network 124. The network 124 may be a local area network (LAN), a wide area network (WAN), or another network configuration. The network 124 may include routers, switches, modems, or any other kind of interface devices used for interconnection. Further, the network 124 may include the Internet or a corporate network.

The NIC 122 may be used to obtain a BIOS update package from another system, such as a server 126 located at a manufacturer. The BIOS update package can be obtained from the server 126 by hyper-text transfer protocol (HTTP), file transfer protocol (FTP), e-mail, or any number of other protocols or systems. The BIOS update package, the current BIOS image, or both may be temporarily stored in the RAM 120 for further processing to determine if a new Public Key is present in the package and if the BIOS ROM 118 should be updated. The area of RAM 120 used for processing of these packages may be secured to allow access only by the SMM code.

Figure 1B:
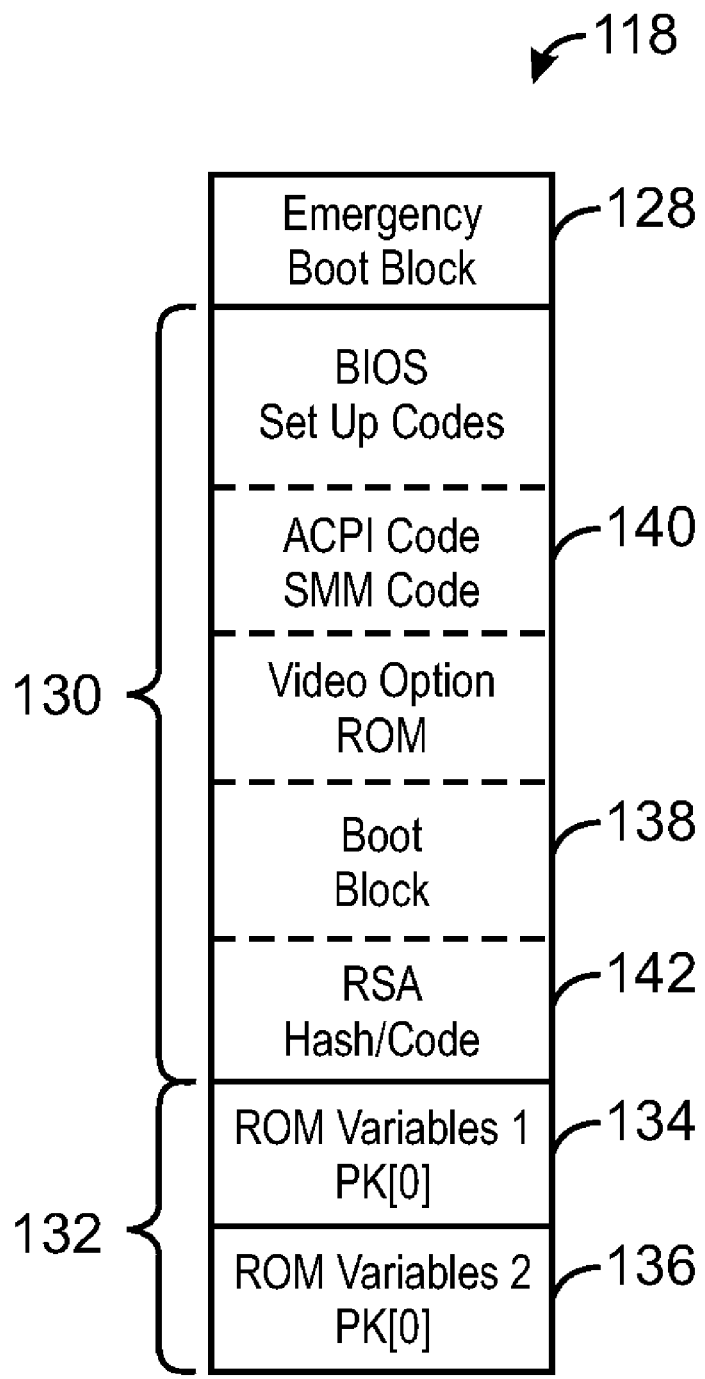
FIG. 1B is a block diagram of a map of a BIOS ROM in accordance with an exemplary embodiment of the present invention.

FIG. 1B is a block diagram showing a map of the BIOS ROM 118 in accordance with an exemplary embodiment of the present invention. As illustrated in FIG. 1B, the BIOS ROM 118 may have a number of functional blocks (for example, code sequences or data) for various purposes, some of which may be updated and others which may be static. For example, an emergency boot block 128 can be used to allow booting of the computer even if the BIOS image 130 is corrupted, such as after an interrupted update process. Other generally static blocks may include ROM variable blocks 132. The ROM variable blocks 132 can include such items as boot settings, password hashes, and a Public Key (for example, PK[0]) for validating Signatures. If two, or more, ROM variable blocks 132 are present, they are generally used as back up versions. For example, if a new Public Key or other variable change is written into a first ROM variable block 134, a second ROM variable block 136 may be left unchanged until the first ROM variable block 134 is successfully used to boot the computer 102. After the first ROM variable block 134 is used to boot the computer 102, the first block 134 may then be copied into the second block 136.

The BIOS ROM 118 contains a BIOS image 130 that can be updated. The BIOS image 130 may include numerous functional blocks, such as a boot block 138 for booting the computer during normal operations, wherein the emergency boot block 128 is not needed. Other blocks may include a block 140 containing an advanced configuration and power interface (ACPI) for controlling hardware operations and the SMM code. Another block may store a hash code 142 for an RSA code. The RSA code is used with the Public Key stored in the ROM variables 134 and 136 to decrypt Signatures and may be provided with a BIOS update package. The RSA hash code may be used to confirm that the RSA code in a BIOS update package has not been corrupted. The RSA code itself may be part of the BIOS image, but may be omitted to save storage space.

The specific configuration of blocks discussed above, including their functionality and interrelationship, is presented as an example and is not to be considered as limiting. Various configurations may be used in exemplary embodiments, depending on system design considerations. Moreover, exemplary functional blocks may comprise elements of hardware (including circuitry), software, firmware, or combinations thereof.

Figure 2:
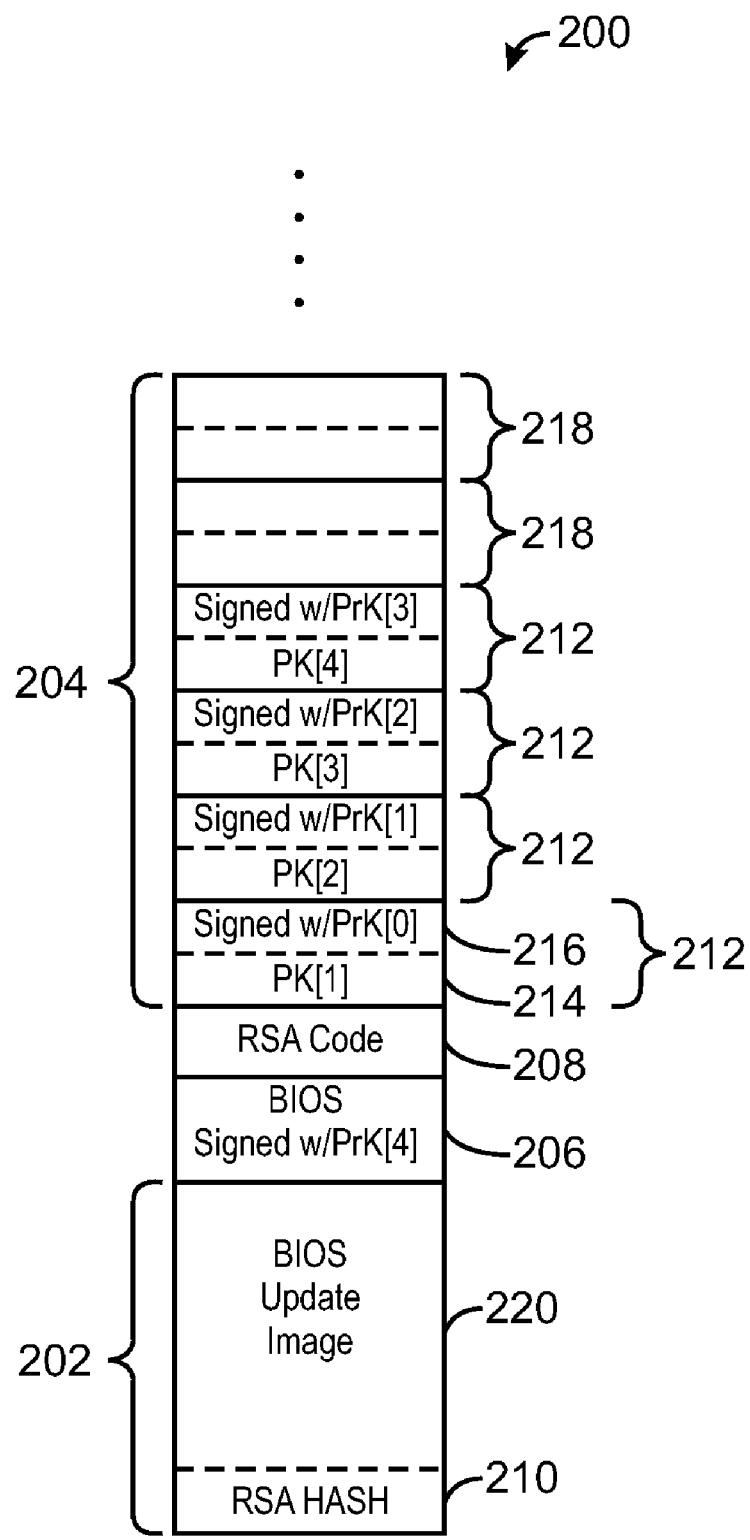
FIG. 2 is a block diagram of a map of a BIOS update package stored on a tangible, computer-readable medium in accordance with an exemplary embodiment of the present invention.

FIG. 2 is a block diagram showing a map of a BIOS update package stored on a tangible, computer-readable medium in accordance with an exemplary embodiment of the present invention. The BIOS update package is generally referred to by the reference number 200. The tangible, computer-readable medium may be an optical drive, a hard drive, a hard drive array, or a flash drive, among others. The BIOS update package 200 may contain a BIOS update region 202 as well as a number of Public Key regions 204. Further, the BIOS update package 200 will typically have a BIOS Signature 206. The BIOS Signature 206 is generated by the provider of the BIOS update package 200 and, as generally described above, is created by first generating a hash of the BIOS image update 202 followed by encrypting the hash with a Private Key (for example, PrK[4] in this illustration). The BIOS update package 200 may also contain the RSA code 208 used for decrypting the Signatures. A SHA-1 HASH code 210 for the RSA code 208 may be stored in the BIOS update region 202. The SHA-1 HASH code 210 allows the SMM code to confirm that the RSA code 208 has not been corrupted or otherwise modified.

As illustrated by blocks 212, the Public Key regions 204 may contain updated Public Keys (for example, PK[1] 214), each of which has a Signature (for example, Signature 216) generated using the previous Private Key. Some or even all of the Public Key regions 204 may be blank, as illustrated by blocks 218. The blank regions 218 may contain bytes that consist of a single character, for example, FF. If all of the Public Key regions 204 are blank, this may indicate that the BIOS upgrade is to be processed using the current Public Key. Although six Public Key regions 204 are illustrated in FIG. 2, any number of Public Key regions may be present, depending on storage space. For example, in exemplary embodiments of the present invention, two, three, five, seven, ten, or more Public Key regions can be present.

In addition to the Public Key regions 204 discussed above, the exemplary update package includes a BIOS image update 220. The BIOS image update 220 may be used to update Public Keys stored in ROM variable blocks 132 (FIG. 1B) and replace a current BIOS image 130, according to the methods discussed with respect to FIGS. 3A, 3B and 4.

Figure 3A:
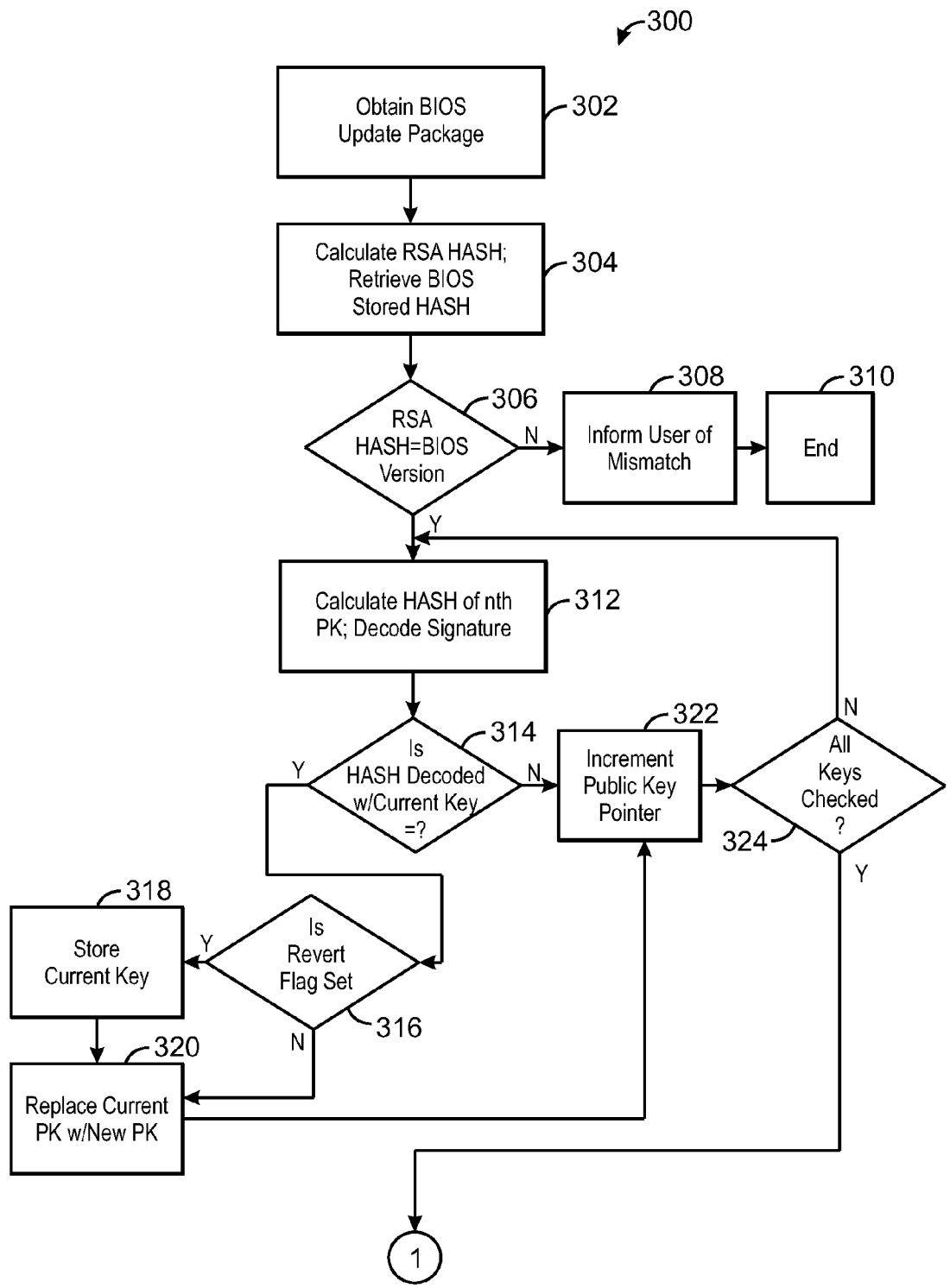
FIG. 3A is a process flow diagram showing a method for updating a Public Key in accordance with an exemplary embodiment of the present invention.

FIG. 3A is a process flow diagram showing a method for updating a Public Key in accordance with an exemplary embodiment of the present invention. The method is generally referred to by reference number 300. Referring also to FIGS. 1A, 1B and 2, the method 300 begins at block 302 when a BIOS update package 200 is obtained for a computer 102. The computer 102 may store the BIOS update package, the current BIOS image, or both in RAM 120 for further processing. As previously mentioned, during the update procedure, the RAM 120 may be secured to allow access only by the SMM code. At block 304, a hash is calculated for the RSA Code 208 in the BIOS update package 200 and a stored reference copy is retrieved for comparison. The stored reference copy of the hash may be the SHA-1 hash code 142 stored in the current BIOS image or may be the SHA-1 HASH code 210 stored in the BIOS update region 202 of the BIOS update package 200. At block 306, the calculated hash code for the RSA code 208 is compared to the reference copy. If the two hash codes do not match, the user is informed of the inconsistency at block 308, all settings are returned to previous values, and the procedure ends at block 310. If the RSA code hash matches the reference copy, the process flow proceeds to block 312.

At block 312, a hash is calculated for the nth Public Key area (for example, PK[1] 214). The corresponding Signature (for example, Signature 216) is decrypted using the current Public Key (for example, PK[0], stored in the ROM variables blocks 132 of the BIOS ROM 118. On the first iteration, the nth Public Key region will generally be the first region in the Public Key regions 204 (for example, containing PK[1] 214). At block 314, the hash for the nth Public Key is compared to the hash obtained by decrypting the Signature using the current Public Key. If there is a match between the two hash codes, process flow proceeds to block 316. As discussed below, the method includes determining if the BIOS update package comprises a revocation-allowed flag; and, if so, storing the current Public Key prior to updating the current Public Key with the new Public Key.

At block 316, a determination is made as to whether a revert flag is set. The revert flag is an indicator that the upgrade of the Public Key may be reversed at a later date. If this flag is set, at block 318 the current Public Key is stored in a secure location, such as in a static area of the BIOS ROM 118. If no revert flag is set, or after the current Public Key is stored, process flow proceeds to block 320. At block 320, the Public Key in the nth Public Key region (for example, updated PK[1] 214) replaces the current Public Key stored in at least one of the ROM variable blocks 132. The Public Key stored in the other ROM variable block 134 may be unchanged until after the BIOS upgrade is successfully completed.

Once the Public Key is updated in block 320 or if the validation of the Public Key region fails (as indicated by a mismatch between the two hash codes in block 314), process flow proceeds to block 322. At block 322, the pointer (for example, n) to the Public Key regions 204 is incremented to point to the next Public Key/Signature Area 212, for example, the region 212 containing PK[2] and the PK[2] Signature encrypted with Private Key PrK[1]. At block 324, a determination is made as to whether all Public Key regions 204 have been checked, for example, if the pointer has exceeded the maximum number of Public Key regions 204 in the BIOS update package 200. If all Public Key regions have not been checked, process flow returns to block 312 to repeat the process.

As a more specific example of the blocks discussed above, the ROM variable blocks 132 illustrated in FIG. 1 contain the initial Public Key, PK[0], that may have been distributed with the computer. The BIOS update package illustrated in FIG. 2 contains four new Public Keys, PK[1]-PK[4]. During initial processing, a hash is generated for PK[1] 214 and the Signature 216 is decrypted with the current Public Key, PK[0], providing the original hash code for PK[1]. The two hash codes are compared, and in this example, are matched. Accordingly, the current Public Key, PK[0], is replaced with the updated Public Key, PK[1]. The pointer is incremented to the Public Key region 204 containing PK[2] and the process is repeated. Since the current Public Key has been updated to PK[1], the hash of PK[2] will match the Signature encrypted with PrK[1] and, thus, the current Public Key will be updated to PK[2]. Similarly, PK[3] will replace PK[2] and PK[4] will then replace PK[3]. As the remaining Public Key regions 204 are blank, as indicated by blocks 218, no hash codes will match and no changes will be made to the Public Keys. In a similar fashion, if all of the Public Key regions 204 are blank or the hash codes do not match, the current Public Key will be unchanged.

Figure 3B:
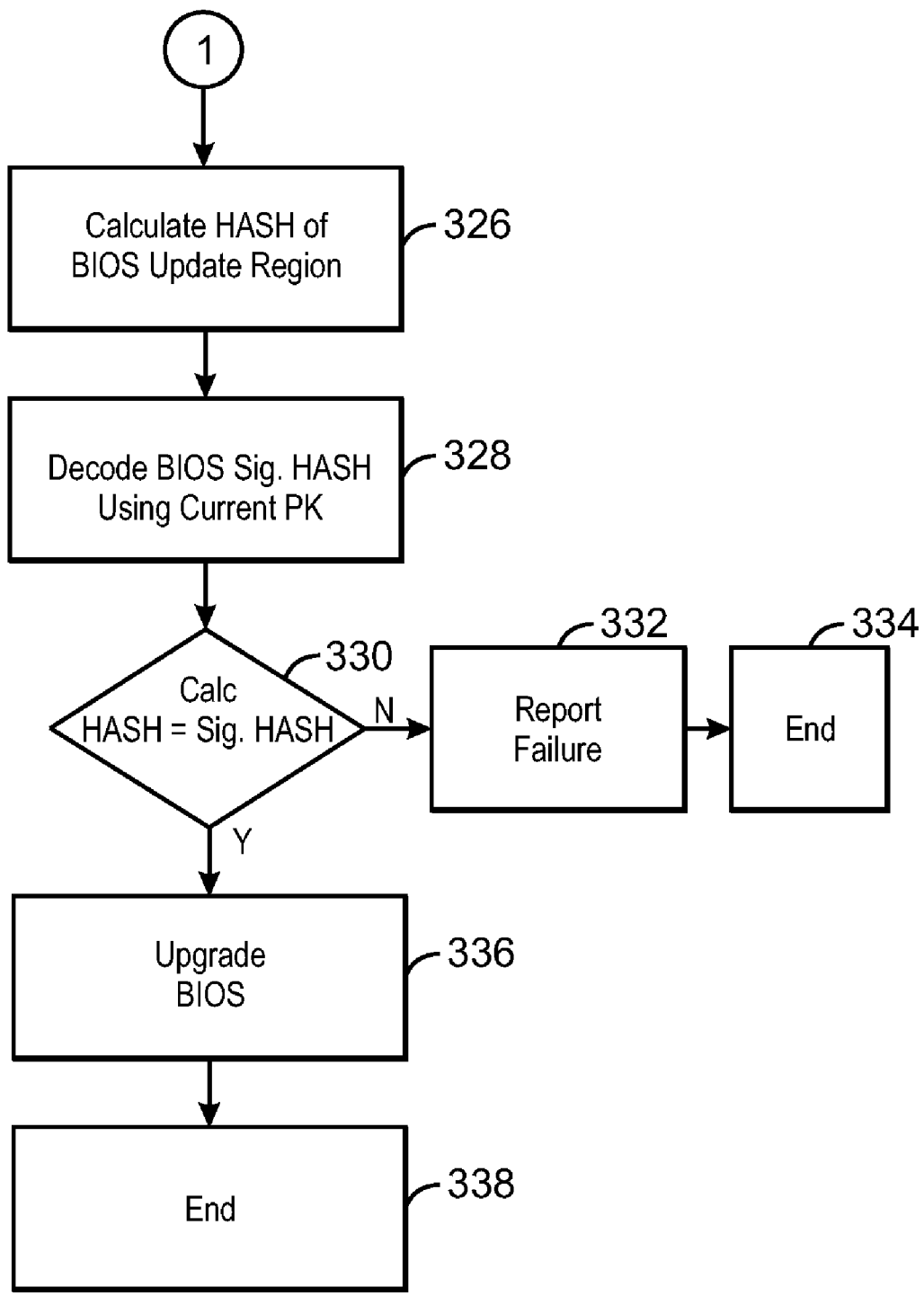
FIG. 3B is a process flow diagram showing a method for updating a BIOS in accordance with an exemplary embodiment of the present invention.

FIG. 3B is a process flow diagram showing a method for updating a BIOS in accordance with an exemplary embodiment of the present invention. Once all Public Key regions 204 have been processed, the current Public Key stored in the ROM variable blocks 132 is used to validate the BIOS image update 202. Specifically, process flow may proceed from block 324 of FIG. 3A to block 326 in FIG. 3B, at which a hash is created for the BIOS update region 202. At block 328, the current Public Key is used to decrypt the BIOS Signature 206. At block 330, the two hash codes are compared and if they do not match, flow proceeds to block 332, where the failure is reported to the user. At this block, the original Public Key may be restored, for example, by copying it from the unchanged ROM variable block 132. The process then terminates at block 334.

If the hash codes match, process flow proceeds to block 336, at which the BIOS image update 220 in the BIOS update package 200 replaces the current BIOS image 130. In the example discussed above, the BIOS Signature 206 was encrypted with PrK[4] and the current Public Key is PK[4]. Thus, the hash codes will match and the BIOS image 130 will be replaced. The process then terminates at block 338, with the activation of the updated BIOS leading to booting of the system.

Figure 4:
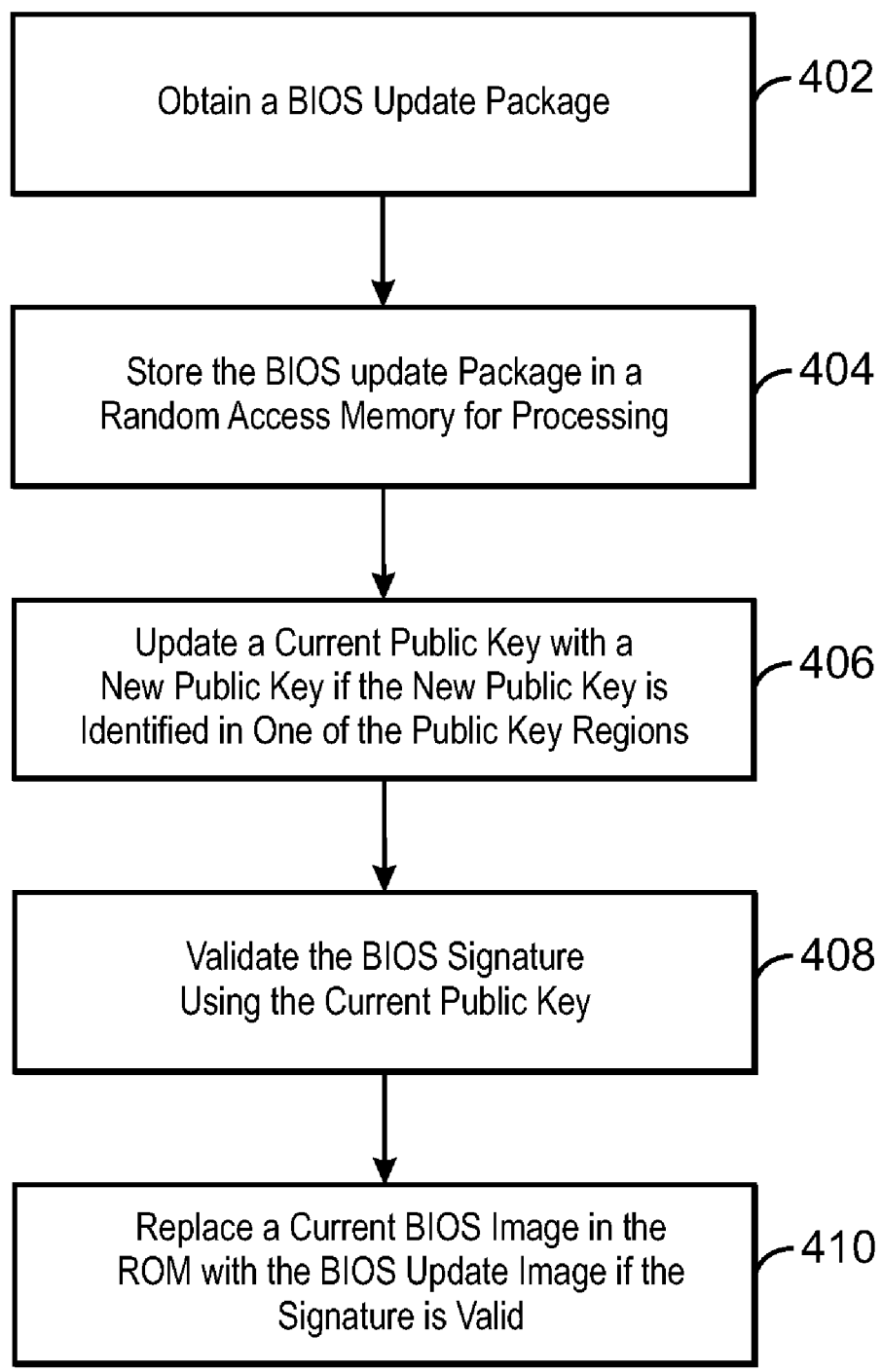
FIG. 4 is a process flow diagram showing a method for updating a BIOS in a memory in accordance with an exemplary embodiment of the present invention.

FIG. 4 is a process flow diagram showing a method for updating a basic input output system (BIOS) in a memory in accordance with an exemplary embodiment of the present invention. The method begins at block 402, when a BIOS update package is obtained. The BIOS update package may include a BIOS image update, a BIOS Signature, and a plurality of Public Key regions, wherein each Public Key region includes a Public Key area and a Signature area. At block 404, the BIOS update package is stored in a random access memory for processing. At block 406, a current Public Key is updated with a new Public Key if the new Public Key is identified in one of the Public Key regions. At block 408, the BIOS Signature is validated using the current Public Key. At block 410, if the Signature is valid, the current BIOS image in the ROM is replaced with the BIOS image update.

What is claimed is:

1. A method for updating a basic input output system (BIOS), comprising:
    obtaining a BIOS update package comprising a BIOS image update, a BIOS Signature, and a plurality of Public Key regions, wherein each of the plurality of Public Key regions comprises a Public Key area and a signature area;
    updating a current Public Key with a new Public Key if the new Public Key is identified in one of the plurality of Public Key regions, wherein updating the current Public Key comprises sequentially processing each of the plurality of Public Key regions from a first region to a final region, comprising:
        validating the new Public Key using a hash-code comparison for the corresponding Public Key region; and
        replacing the current Public Key with the new Public Key if the new Public Key is valid; and
    after the updating is performed, validating the BIOS Signature using the current Public Key.

2. The method of claim 1, comprising replacing a current BIOS image with the BIOS image update if the BIOS Signature is valid.

3. The method of claim 1, wherein validating the new Public Key comprises:
    decrypting the signature area of a selected one of the plurality of Public Key regions using the current Public Key to obtain a signature hash code;
    creating a new hash code of the Public Key area of the selected one of the plurality of Public Key regions;
    comparing the signature hash code to the new hash code; and determining that the new Public Key is valid if the signature hash code matches the new hash code.

4. The method of claim 3, wherein decrypting the signature area comprises processing the signature area with an RSA decryption algorithm.

5. The method of claim 3, wherein creating the new hash code comprises processing the selected Public Key region using a standard hashing algorithm (SHA) comprising a SHA-1 algorithm, a SHA-2 algorithm, or both.

6. The method of claim 2, wherein replacing the current BIOS comprises:
    decrypting the BIOS Signature using the current Public Key to obtain a signature hash code;
    creating a new hash code of the BIOS image update; and comparing the signature hash code to the new hash code to determine if the BIOS image update is valid.

7. The method of claim 2, wherein replacing the current BIOS image with the BIOS image update comprises flashing the BIOS image update to a flash read only memory (ROM) in place of the current BIOS image.

8. The method of claim 1, comprising:
    determining if the BIOS update package comprises a revocation-allowed flag comprising a revert flag set to indicate that updating of the Public Key may be reversed at a later date; and, if so,
    storing the current Public Key in a static area for possible reversion prior to updating the current Public Key with the new Public Key.

9. The method of claim 8, wherein storing in the static area and updating comprises flashing the current Public Key to a BIOS read only memory (ROM).

10. A system for updating a basic input output system (BIOS), comprising
    a processor configured to obtain a BIOS update package, wherein the BIOS update package comprises a BIOS image update, a BIOS Signature, and a plurality of regions that are each configured with a separate Public Key area and an associated Signature area;
    a BIOS memory comprising a current BIOS image and a current Public Key, wherein the current BIOS image comprises code configured to:
        analyze the BIOS update package to determine if one of the plurality of regions comprises a new Public Key, and, if so, update the current Public Key by sequentially processing each of the plurality of regions from a first region to a final region, wherein the code configured to update the current Public Key is configured to:
            validate a new Public Key using a hash-code comparison for the corresponding region; and
            replace the current Public Key with the new Public Key if the new Public Key is valid; and
        after sequentially processing each of the plurality of regions, validate the BIOS image update using the BIOS Signature and the current public key.

11. The system of claim 10, comprising a network interface card, wherein the processor is configured to download the BIOS update package from a remote server.

12. The system of claim 10, wherein the BIOS image update comprises system management mode (SMM) code.

13. The system of claim 10, wherein the BIOS memory comprises a flash read only memory (ROM).

14. The system of claim 10, wherein the code configured to validate the new Public Key is configured to:
    decrypt the associated Signature area of a selected one of the plurality of regions using the current Public Key to obtain a signature hash code;
    create a new hash code of the Public Key area of the selected one of the plurality of regions;
    compare the signature hash code to the new hash code; and determine that the new Public Key is valid if the signature hash code matches the new hash code.

15. The system of claim 10, wherein the current BIOS image comprises code configured to direct the processor to create a hash code from a target memory location.

16. The system of claim 10, wherein the current BIOS image comprises code configured to direct the processor to decrypt a target memory location using the current Public Key.

17. A tangible, non-transitory computer readable medium comprising instructions configured to direct a processor to:
    obtain a BIOS update package comprising a BIOS update, a BIOS Signature, and a plurality of Public Key regions;
    determine if a new Public Key has been provided in any of the plurality of Public Key regions and, if so, update a current Public Key with the new Public Key by sequentially processing each of the plurality of regions from a first region to a final region, wherein the code configured to update the current Public Key instructs the processor to:
- validate the new Public Key using a hash-code comparison for the corresponding Public Key region; and
- replace the current Public Key with the new Public Key if the new Public Key is valid; and
- validate the BIOS Signature using the current Public Key.

18. The tangible, non-transitory computer readable medium of claim 17, comprising code configured to direct the processor to:
- replace a current BIOS in the ROM with the contents of the BIOS update if the BIOS Signature is valid.

19. The tangible, non-transitory computer readable medium of claim 17, wherein the code configured to validate the new Public Key is configured to direct the processor to:
- decode a signature area of one of the plurality of Public Key regions using the current Public Key to obtain a signature hash code;
- create a new hash code of a Public Key area of the one of the plurality of Public Key regions;
- compare the signature hash code to the new hash code; and
- determine that the new Public Key is valid if the signature hash code matches the new hash code.

20. The tangible, non-transitory machine readable medium of claim 17, comprising code configured to direct the processor to create a hash code of a target character string.

* * * * *

UNITED STATES PATENT AND TRADEMARK OFFICE
CERTIFICATE OF CORRECTION

PATENT NO. : 8,296,579 B2
APPLICATION NO. : 12/613677
DATED : October 23, 2012
INVENTOR(S) : Mark A. Piwonka et al.

It is certified that error appears in the above-identified patent and that said Letters Patent is hereby corrected as shown below:

In the Claims:

In column 8, line 15, in Claim 10, delete "comprising" and insert -- comprising: --, therefor.

In column 10, line 12, in Claim 20, delete "machine" and insert -- computer --, therefor.

Signed and Sealed this
Thirtieth Day of April, 2013

Teresa Stanek Rea
*Acting Director of the United States Patent and Trademark Office*